(12) United States Patent
Huff

(10) Patent No.: US 12,344,442 B2
(45) Date of Patent: Jul. 1, 2025

(54) WATER BOTTLE AND LEAKPROOF CAP FOR WATER BOTTLE

(71) Applicant: Technical Response, Inc., Knoxville, TN (US)

(72) Inventor: Leonard Scott Huff, Knoxville, TN (US)

(73) Assignee: Technical Response, Inc., Knoxville, TN (US)

( * ) Notice: Subject to any disclaimer, the term of this patent is extended or adjusted under 35 U.S.C. 154(b) by 0 days.

(21) Appl. No.: 18/617,672

(22) Filed: Mar. 27, 2024

(65) Prior Publication Data
US 2024/0336404 A1 Oct. 10, 2024

(30) Foreign Application Priority Data
Apr. 4, 2023 (CN) .......................... 202320809959.4

(51) Int. Cl.
*B65D 41/04* (2006.01)
(52) U.S. Cl.
CPC .... *B65D 41/0457* (2013.01); *B65D 2251/205* (2013.01)
(58) Field of Classification Search
CPC .......... B65D 41/0457; B65D 2251/205; B65D 41/0442; B65D 2543/0049; B65D 41/0414; B65D 41/0421; B65D 41/0428; Y02W 30/80
See application file for complete search history.

(56) References Cited

U.S. PATENT DOCUMENTS

| | | | |
|---|---|---|---|
| 6,105,807 A * | 8/2000 | McCrossen | B65D 51/249 220/288 |
| 10,472,134 B1 * | 11/2019 | Bergida | B65D 41/0435 |
| 2008/0173612 A1 * | 7/2008 | Renz | A61J 9/04 137/526 |
| 2020/0245818 A1 * | 8/2020 | Halkes | B65D 43/0225 |
| 2022/0177196 A1 * | 6/2022 | den Boer | B05B 11/0056 |
| 2024/0025614 A1 * | 1/2024 | Haas | B65D 47/12 |

* cited by examiner

*Primary Examiner* — Shawn M Braden
(74) *Attorney, Agent, or Firm* — Luedeka Neely, P.C.

(57) ABSTRACT

A leakproof cap of a soft water bottle and a water bottle are disclosed. The leakproof cap includes a cap body having an installation cavity with a screw thread circumferentially arranged on a side of the installation cavity, and a sealing member annularly arranged on another side of the installation cavity that is opposite to the screw thread at a predetermined distance. The sealing member is an elastic sealing member and a side of the sealing member facing the screw thread has a plurality of sealing rings. The sealing rings are arranged concentrically and evenly, and a sealing cavity is formed between adjacent sealing rings. When the bottle opening deforms following the bottle body, the sealing member adapts to the deformation and blocks the liquid through the plurality of sealing rings.

9 Claims, 5 Drawing Sheets

WATER BOTTLE AND LEAKPROOF CAP FOR WATER BOTTLE

CROSS-REFERENCE TO RELATED APPLICATIONS

The present application claims priority to Chinese patent application No. 202320809959.4, filed Apr. 4, 2023, all of which is incorporated herein by reference.

FIELD OF THE DISCLOSURE

The present disclosure relates to the technical field of water bottle leakage prevention, and in particular to a water bottle and a leakproof cap of a soft water bottle.

BACKGROUND

With the continuous improvement of athletes' competitive levels, the competitiveness in sports arenas has also been on the rise. For athletes themselves, timely hydration through sports drinks has become an important aspect of sports support. In order to facilitate athletes in quickly rehydrating, sports water bottles have undergone continuous iterations, resulting in the development of squeeze-type water bottles with soft material bodies.

In the prior art, the structure of squeeze-type water bottles is similar to that of the squeeze-type container provided by CN215246732U, which both utilize pressure on the bottle body to squeeze out the liquid inside the container. However, the difference lies in the fact that materials of the bottle body and bottle opening are softer. Therefore, when the user squeezes the bottle body, gaps may easily form at the connection between the bottle opening and cap due to deformation, leading to liquid leakage and affecting the user experience.

Therefore, the existing technology still needs to be improved and developed.

BRIEF SUMMARY OF THE DISCLOSURE

In order to solve the problem of liquid leakage caused by deformation and gaps forming at the connection between the bottle neck and cap when users squeeze the bottle body in existing squeeze-type water bottles, thereby affecting the user experience, the present disclosure provides a water bottle and a leakproof cap of a soft water bottle.

The present disclosure is realized through the following technical solutions.

The present disclosure provides a leakproof cap of a soft water bottle that includes:
- a cap body that includes an installation cavity and a screw thread is circumferentially arranged on a side of the installation cavity;
- a sealing member that is annularly arranged on another side of the installation cavity and is opposite to the screw thread at a predetermined distance, wherein the sealing member is an elastic sealing member, wherein a side of the sealing member facing the screw thread has a plurality of sealing rings arranged, wherein the plurality of sealing rings are arranged concentrically and evenly, and a sealing cavity is formed between adjacent sealing rings.

In the leakproof cap of a soft water bottle, the cap body includes:
- an upper bottle cover plate;
- an outer cover plate that is arranged vertically on an outer side of the upper bottle cover plate, and the screw thread is arranged on the outer cover plate;
- a limiting ring plate that is vertically arranged on an inner side of the upper bottle cover plate, and the sealing member is arranged to fit on the upper bottle cover plate and the limiting ring plate;
- wherein the upper bottle cover plate, the outer cover plate and the limiting ring plate are integrally formed, and the installation cavity is located between the outer cover plate and the limiting ring plate.

In the leakproof cap of a soft water bottle, the sealing member includes:
- a first sealing part that is arranged to fit on the upper bottle mouth cover plate; and
- a second sealing part that is arranged to fit on the limiting ring plate,
- wherein the first sealing part and the second sealing part are in contact with each other and are integrally formed, and
- wherein the first sealing part and the second sealing part are arranged with a predetermined angle.

In the leakproof cap of a soft water bottle, a cross-section of the sealing ring is semicircular, and a position between adjacent sealing rings is arranged in smooth transition, and the sealing rings include:
- one or more first sealing rings that are evenly arranged on the first sealing part and protrude toward a direction of the first sealing part away from the upper bottle cover plate; and
- one or more second sealing rings that are evenly arranged on the second sealing part and protrude toward a direction of the second sealing part away from the limiting ring plate,
- wherein a diameter of the first sealing ring is smaller than or equal to a diameter of the second sealing ring.

In the leakproof cap of a soft water bottle, the sealing member further includes a third sealing part that is arranged to fit on a bottom of the limiting ring plate, wherein the first sealing part, the second sealing part and the third sealing part are integrally formed, and positions where the first sealing part, the second sealing part and the third sealing part are connected to each other are arranged in smooth transition.

In the leakproof cap of a soft water bottle, an installation groove is arranged on the upper bottle cover plate corresponding to the installation cavity, and the first sealing part is fitted in the installation groove, wherein a depth of the installation groove is smaller than or equal to a thickness of the first sealing part.

In the leakproof cap of a soft water bottle, a shape of the upper bottle cover plate is annular, and a fixing member is provided in an inner hole of the upper bottle cover plate, and a plurality of connecting tenons are arranged around the fixing member, and the plurality of connecting tenons are fixedly connected to the upper bottle cover plate and the limiting ring plate.

In the leakproof cap of a soft water bottle, the fixing member includes a plurality of water holes that are hollowed out at positions between adjacent connecting tenons.

In the leakproof cap of a soft water bottle, the sealing member is two-stage injection molded and arranged on the cap body, and the sealing member and the cap body are made of different materials.

The present disclosure also provides a water bottle that includes the leakproof cap as described above.

The beneficial effects of the present disclosure include providing an elastic sealing member in the installation cavity of the cap body, wherein the sealing member corresponds to the screw thread. When screwing the cap body on the bottle opening, the screw thread and the sealing member are in contact with the upper part and outer part of the bottle opening, respectively. Further, several sealing rings are concentrically arranged on the sealing member, which form multiple barriers to the inner part of the bottle opening. When the bottle opening deforms along with the bottle body, the sealing member deforms adaptively, and the sealing rings form a barrier to liquid, effectively preventing liquid leakage from the bottle opening.

BRIEF DESCRIPTION OF THE DRAWINGS

In FIGS. 1 to 5:100, Cap body; 101, Installation cavity; 110, Upper bottle cover plate; 111, Installation groove; 120, Outer cover plate; 130, Limiting ring plate; 140, Screw thread; 200, Sealing member; 210, First sealing part; 220, Second sealing part; 230, Third sealing part; 240, Sealing ring; 241, First sealing ring; 242, Second sealing ring; 300, Fixing member; 310, Connecting tenon; 320, Water hole; 400, Bottle opening; and 410, Matching thread.

DETAILED DESCRIPTION OF EMBODIMENTS

Figure 1:
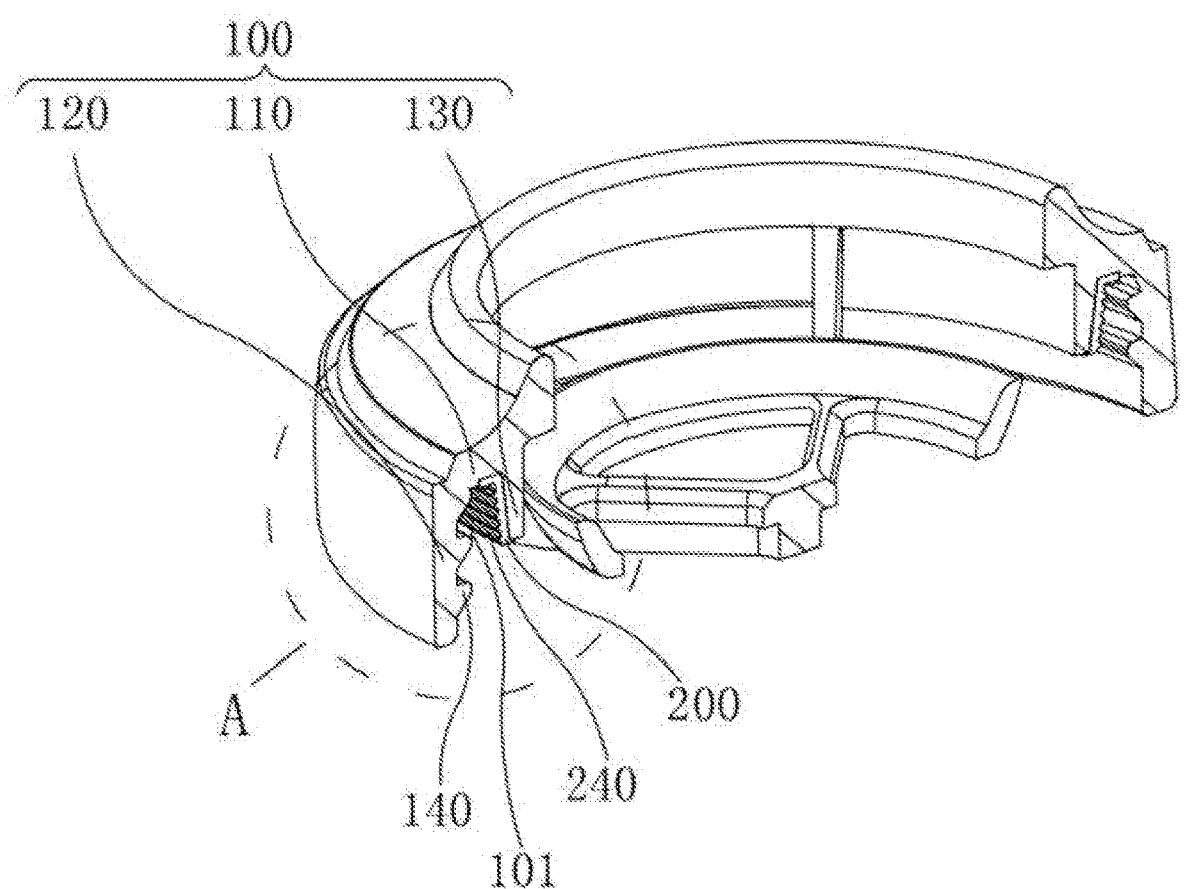
FIG. 1 is a schematic diagram of semi-sectional structure of the leakproof cap of a soft water bottle according to the present disclosure.

In order to make the purpose, technical solution, and effect of the present disclosure clearer, the present disclosure is further described in detail below with reference to the accompanying drawings and embodiments. It should be understood that the embodiments described here are only used to explain the present disclosure and are not intended to limit the present disclosure.

It should be noted that directional indications (such as up, down, left, right, front, back . . . ) in the embodiments of the present disclosure are only used to explain the position relationships between each component in a certain posture (as shown in the drawings). If the posture changes, the directional indications should also change accordingly.

In addition, the descriptions involving "first", "second", etc. in the embodiments of the present disclosure are only for descriptive purposes and cannot be understood as instructions or implications of the importance or the quantity of technical features. Thus, features defined as "first" and "second" may explicitly or implicitly include at least one of the described features. In addition, the technical solutions in various embodiments can be combined with each other, but the combination must be performed based on the realization by those skilled in the art. When the combination of technical solutions is contradictory or cannot be realized, it should be considered that such a combination of technical solutions does not exist, nor is it within the protection scope of the present disclosure.

In the prior art, the structure of squeeze-type water bottles is similar to that of the squeeze-type container provided by CN215246732U, which both utilize pressure on the bottle body to squeeze out the liquid inside the container. However, the difference lies in the fact that materials of the bottle body and bottle opening are softer. Therefore, when the user squeezes the bottle body, gaps may easily form at the connection between the bottle opening and cap due to deformation, leading to liquid leakage and affecting the user experience.

Aiming at solving the above problems in the prior art, the present disclosure provides a leakproof cap of a soft water bottle. As shown in FIG. 1, the leakproof cap of a soft water bottle includes a cap body 100, and the cap body 100 includes an installation cavity 101. A screw thread 140 is circumferentially provided on one side of the installation cavity 101, and a sealing member 200 is annularly provided on the other side of the installation cavity 101, and is opposite to the screw thread 140 at a predetermined distance. The sealing member 200, which is an elastic seal, is provided with a plurality of sealing rings 240 on the side facing the screw thread 140. The plurality of sealing rings 240 are concentrically and evenly arranged, and a sealing cavity is formed between adjacent sealing rings 240.

The present disclosure provides an elastic sealing member 200 in the installation cavity 101 of the cap body 100. The sealing member 200 corresponds to the screw thread 140. When the cap body 100 is screwed on the bottle opening 400 of the water bottle, the screw thread 140 and the sealing member 200 are fit on an upper part and an outer part of the bottle opening 400, respectively. A plurality of sealing rings 240 are concentrically arranged on the sealing member 200 to form multiple barriers to the inside of the bottle opening 400. When the bottle opening 400 deforms along with the bottle body, the sealing member 200 deforms adaptively and blocks the liquid through the plurality of sealing rings 240, effectively preventing liquid leakage from the bottle opening 400.

Figure 3:
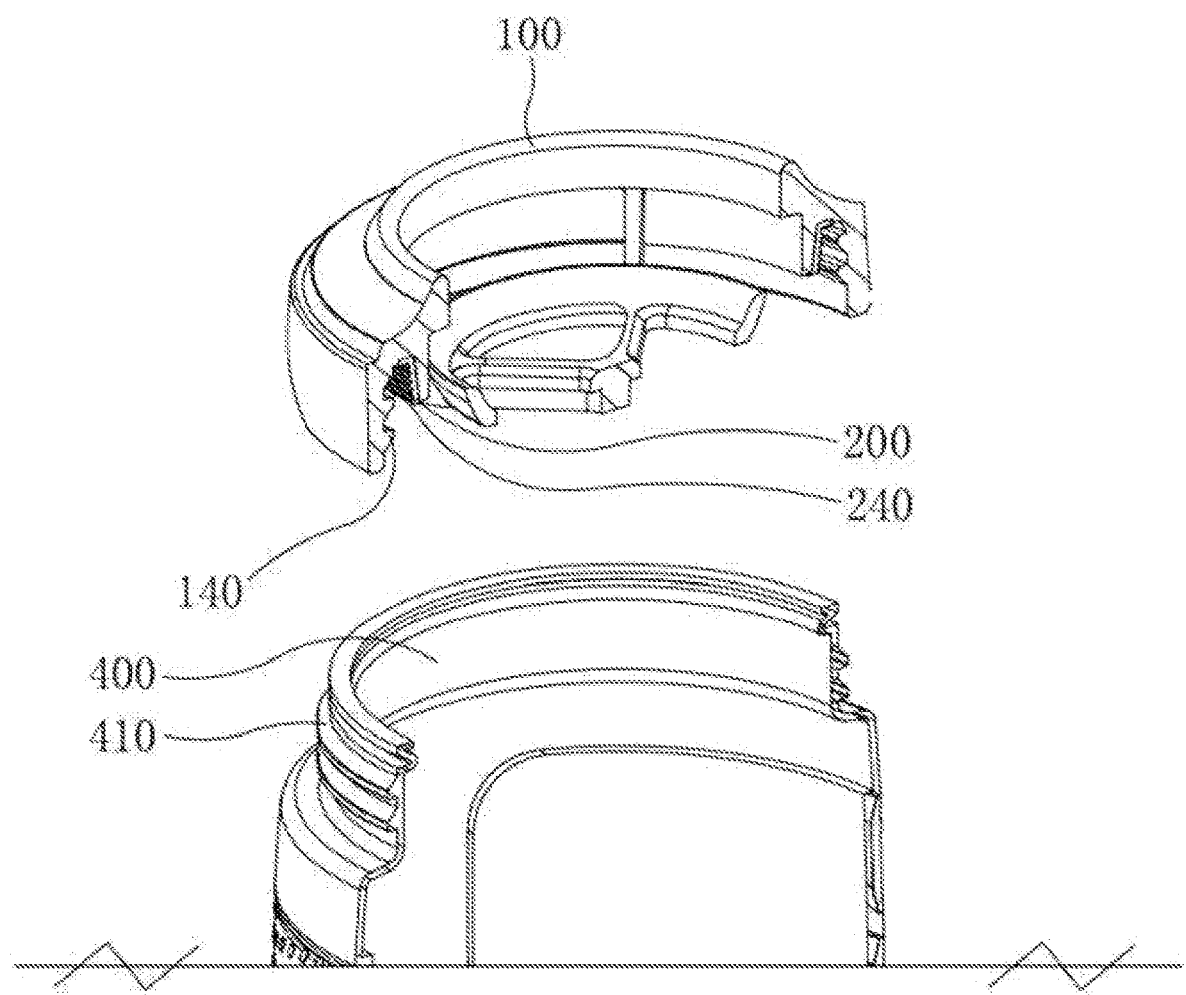
FIG. 3 is a schematic structural diagram of installation of the leakproof cap of a soft water bottle according to the present disclosure.

In the present embodiment, the main body of the leakproof cap of a soft water bottle of the present disclosure comprises the cap body 100 and the sealing member 200. As shown in FIG. 3, in actual use the cap body 100 is screwed on the bottle opening 400. For the convenience of description, as shown in FIG. 1, in the present embodiment, the space on the cap body 100 used for being combined with the bottle opening 400 is referred to as the installation cavity 101, and a screw thread 140 is arranged on one side of the installation cavity 101 of the cap body 100. Correspondingly, a matching thread 410 is arranged at the bottle opening 400 corresponding to the screw thread 140. The matching thread 410 provided at the bottle opening 400 is a common setting for the water bottle opening 400 in the prior art, and no specific limitation in the present application. Those skilled in the art should understand that the matching thread 410 and the screw thread 140 are adapted to each other and rotationally engaged.

As shown in FIG. 1, the sealing member 200 is arranged on the other side of the installation cavity 101. In the present embodiment, the sealing member 200 is disposed in an annular shape according to the circular structure of the cap body 100, and the sealing member 200 and the screw threads 140 are arranged opposite each other at a predetermined distance that should be equal to or smaller than the size of the bottle opening 400. The sealing member 200 is made of elastic materials when actually installed, such as rubber, silicone, thermoplastic elastomers, etc. When the cap body 100 is screwed on the bottle opening 400, the sealing member 200 is in contact with the inside of the bottle opening 400 to seal the liquid in the bottle opening 400, thereby achieving the effect of preventing liquid leakage.

Further, a plurality of sealing rings 240 are arranged on the side of the sealing member 200 facing the screw thread 140. The sealing rings 240 are integrally formed with the sealing member 200 and are concentrically and evenly arranged on the annular sealing member 200. In the present embodiment, as shown in FIG. 1, the plurality of sealing rings 240 protrude toward the screw thread 140. As shown in FIG. 3, after the cap body 100 is screwed on the bottle opening 400, the outer matching thread 410 of the bottle opening 400 and the screw thread 140 are engaged. The inner side of the bottle opening 400 is in contact with the plurality of sealing rings 240, and isolation spaces are formed between adjacent sealing rings 240, which can realize multiple barriers to the liquid in the bottle opening 400. Since the sealing member 200 is made of elastic material, when bottle opening 400 is deformed according to the deformation of the water bottle, the plurality of sealing rings 240 can deform along with the shape of the bottle opening 400 to maintain a multi-barrier protection structure. Therefore, the present disclosure can effectively prevent the leakage at the bottle opening 400 of the water bottle.

Based on the present embodiments, in one implementation of the present disclosure as shown in FIG. 1, the cap body 100 includes an upper sealing plate, an outer cover plate 120 and a limiting ring plate 130, wherein the upper sealing plate is configured to be in contact with an upper end surface of the bottle opening 400 to block the upper end surface of the bottle opening 400. The outer cover plate 120 is vertically arranged on an outer side of the upper sealing plate while the screw thread 140 is arranged on the outer cover plate 120. Thus, the outer cover plate 120 plays the role of sealing the outer side of the bottle opening 400. The limiting ring plate 130 is vertically arranged on the inner side of the upper sealing plate while the sealing member 200 is arranged on the limiting ring plate 130. Thus, the limiting ring plate 130 plays the role of sealing the inner side of the bottle opening 400. During actual installation, the upper sealing plate, the outer cover plate 120 and the limiting ring plate 130 are integrally formed to provide an inverted "U" shape for the joint between the cap body 100 and the bottle opening 400, and to seal the bottle opening 400 by the rotational engagement between the screw thread 140 and the matching thread 410. The installation cavity 101 is the space between the outer cover plate 120 and the limiting ring plate 130. The limiting effect of the outer cover plate 120 and the limiting ring plate 130 forms a horizontal effect on the bottle opening 400. Therefore, the inner wall of the bottle opening 400 provides pressure on the sealing member 200 when the cap body 100 is screwed on the bottle opening 400, and facilitates the sealing rings 240 arranged on the sealing member 200 to realize multi-barrier function to liquid. The sealing rings can adaptively deform according to the deformation of the bottle opening 400 to ensure the sealing effect.

Figure 2:
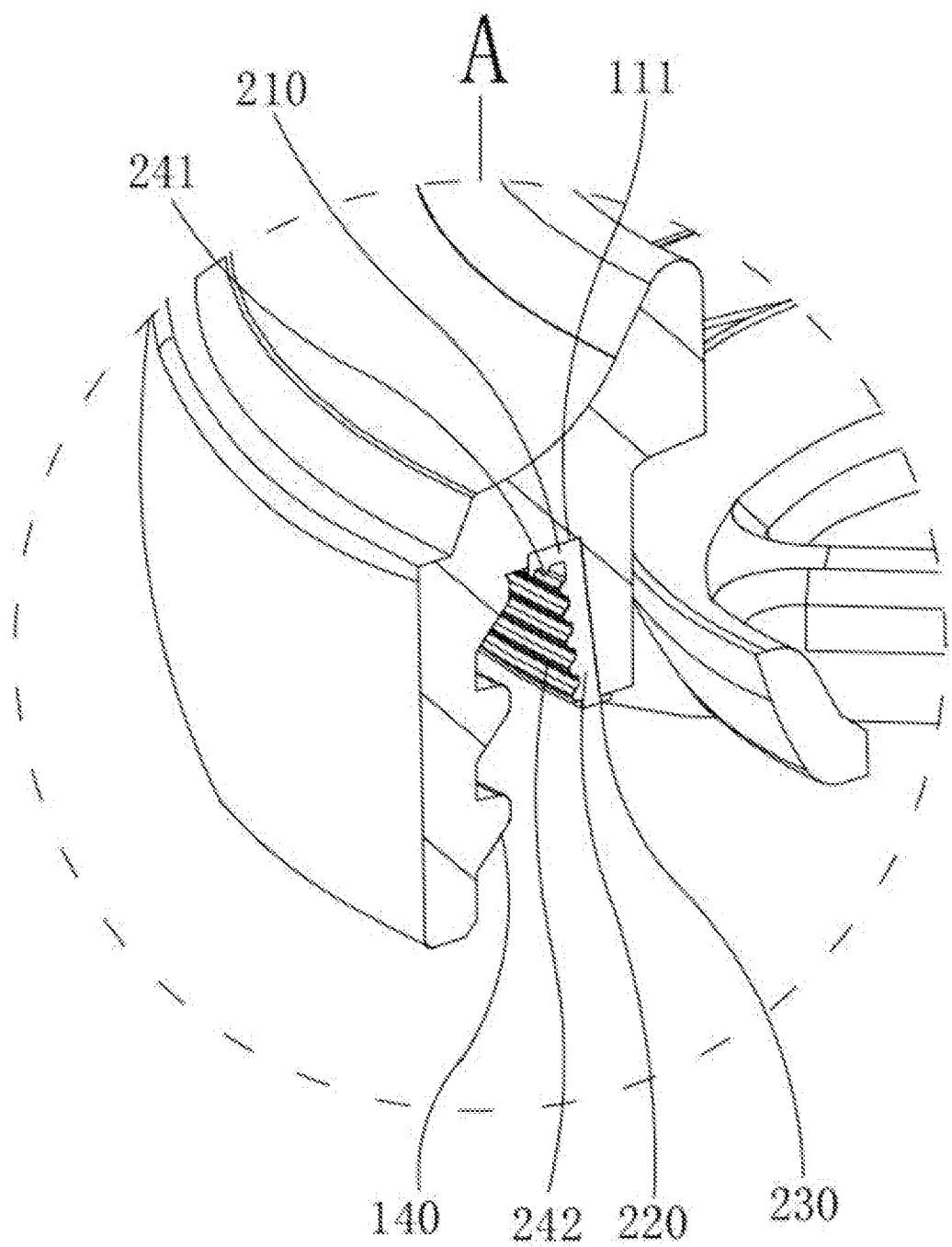
FIG. 2 is an enlarged structural diagram of part A of the leakproof cap of a soft water bottle in FIG. 1 according to the present disclosure.

Further, based on the present embodiment, as shown in FIG. 1 and FIG. 2, the sealing member 200 is composed of a first sealing part 210 and a second sealing part 220. The first sealing part 210 and the second sealing part 220 are integrally formed and have an "L" shape. The first sealing part 210 is arranged to fit on the upper bottle cover plate 110, and the second sealing part 220 is arranged to fit on the limiting ring plate 130. The purpose of such arrangement is to ensure the plurality of sealing rings 240 form a multi-barrier structure on the inner wall and upper end of the bottle opening 400, respectively. Even if the barrier structure on the inner wall of the bottle opening 400 fails due to excessive deformation, the sealing rings 240 on the upper end of the bottle opening 400 can still achieve the sealing effect.

In an implementation, the first sealing part 210 and the second sealing part 220 are arranged with a predetermined angle. In order to facilitate the installation of the bottle opening 400 and the cap body 100 and ensure the effectiveness of the sealing rings 240, in the present embodiment, the angle between the first sealing part 210 and the second sealing part 220 is limited to be greater than or equal to 90°. When the angle is set as 90°, the bottle opening 400 and the second sealing part 220 can be completely fitted to ensure the sealing effect. When the angle is set to be greater than 90°, the function of guiding the bottle opening 400 into the installation cavity 101 is achieved, and differences remain for the forces on different sealing rings 240, which leads to various deformation effects following the bottle opening 400.

As shown in FIG. 2, a cross-section of the sealing rings 240 is semicircular, and the positions between adjacent sealing rings 240 are smoothly transitioned, that is, the surface of the sealing member 200 is arranged in a wavy shape. The purpose of such arrangement is to guide the bottle opening 400 when entering the installation cavity 101 and to prevent the upper end surface of the bottle opening 400 from engaging with the lower end of the sealing ring 240, thereby not hindering the combination of the bottle opening 400 and the cap body 100. At the same time, in the present embodiment, the sealing rings 240 also include a first sealing ring 241 and a second sealing ring 242. The diameter of the first sealing ring 241 is smaller than or equal to the diameter of the second sealing ring 242. A plurality of first sealing rings 241 are arranged on the first sealing part 210 and protrude toward the direction of the first sealing part 210 and away from the upper bottle cover plate 110. The second sealing ring 242 is arranged on the second sealing part 220 and protrudes toward the direction of the second sealing part 220 away from the upper bottle cover plate 110. In the present embodiment, since the first sealing part 210 is arranged on the upper bottle cover plate 110, the arrangement of the first sealing ring 241 should not hinder the combination between the bottle opening 400 and the upper bottle cover plate 110. By setting the diameter of the first sealing ring 241 to be smaller can ensure the screwed position between the bottle opening 400 and the upper bottle cover plate 110 reaches a predetermined position and ensure the formation of multiple sealing structures. The second sealing part 220 is arranged on the limiting ring plate 130, and the multiple sealing structures can only be formed by the second sealing ring 242 to further press the inner side of the bottle opening 400, so the diameter of the second sealing ring 242 is set larger.

Based on the present embodiment, as shown in FIG. 1 and FIG. 2, the sealing member 200 further includes a third sealing part 230 that is arranged on the bottom of the limiting ring plate 130. In the present embodiment, the first sealing part 210, the second sealing part 220 and the third sealing part 230 are integrally formed to show a "Z" shape. The connecting positions between the first sealing part 210, the second sealing part 220 and the third sealing part 230 are smoothly transitioned, which has the advantage that the third sealing part 230 plays a certain guiding role to prevent the upper end of the bottle opening 400 from damaging the fixing relationship between the second sealing part 220 and the limiting ring plate 130 due to inaccurate correspondence when the user screws the cap body 100 on the bottle opening 400. The sealing member 200 is arranged in this way to assist the user to screw the cap body 100 on the bottle opening 400, thereby forming the cooperative function between the cap body 100 and the first sealing ring 241 and the second sealing ring 242.

Based on the present embodiments, in another implementation of the present disclosure, as shown in FIG. 1 and FIG. 2, an installation groove 111 is further provided on the upper bottle cover plate 110 corresponding to the installation cavity 101, and the first sealing part 210 of the sealing member 200 is fitted inside the installation groove 111, thereby preventing the sealing member 200 from falling off. In another aspect, such arrangement has the advantage of locating the arranged position of the sealing member 200 during the manufacturing process. In the present embodiment, all the structures of the cap body 100 are integrally formed. After the shaping of the cap body 100 is completed, the sealing member 200 is made by secondary molding, that is, buckling a mold on the main body of the cap body 100, and performing two-stage injection molding to form the sealing member 200 on the cap body 100. This manufacturing process not only ensures that the tolerance of the sealing member 200 is extremely small, but also improves the stability of connection between the sealing member 200 and the cap body 100, which avoids the impact of later bonding on the water quality of the water bottle. In addition, such manufacturing process can also avoid shrink marks or burrs on the surface of the cap body 100, effectively improving production efficiency.

In the present embodiment, the depth of the installation groove 111 should be smaller than or equal to the thickness of the first sealing part 210. The purpose of such arrangement is to ensure the first sealing ring 241 protrudes from the surface of the upper sealing plate and forms multiple sealing structures by connecting with the upper end surface of the bottle opening 400. At the same time, it is worth noting that in the present embodiment, the cap body 100 and the sealing member 200 are made of different materials. The cap body 100 can be made of polypropylene copolymer or other hard materials to ensure toughness and strength. The sealing member 200 is made of rubber, silicone, thermoplastic elastomer, and other materials, which provides the deformation property for adaptive deformation following the bottle opening 400 and provides waterproofness for achieving sealing effect.

Figure 4:
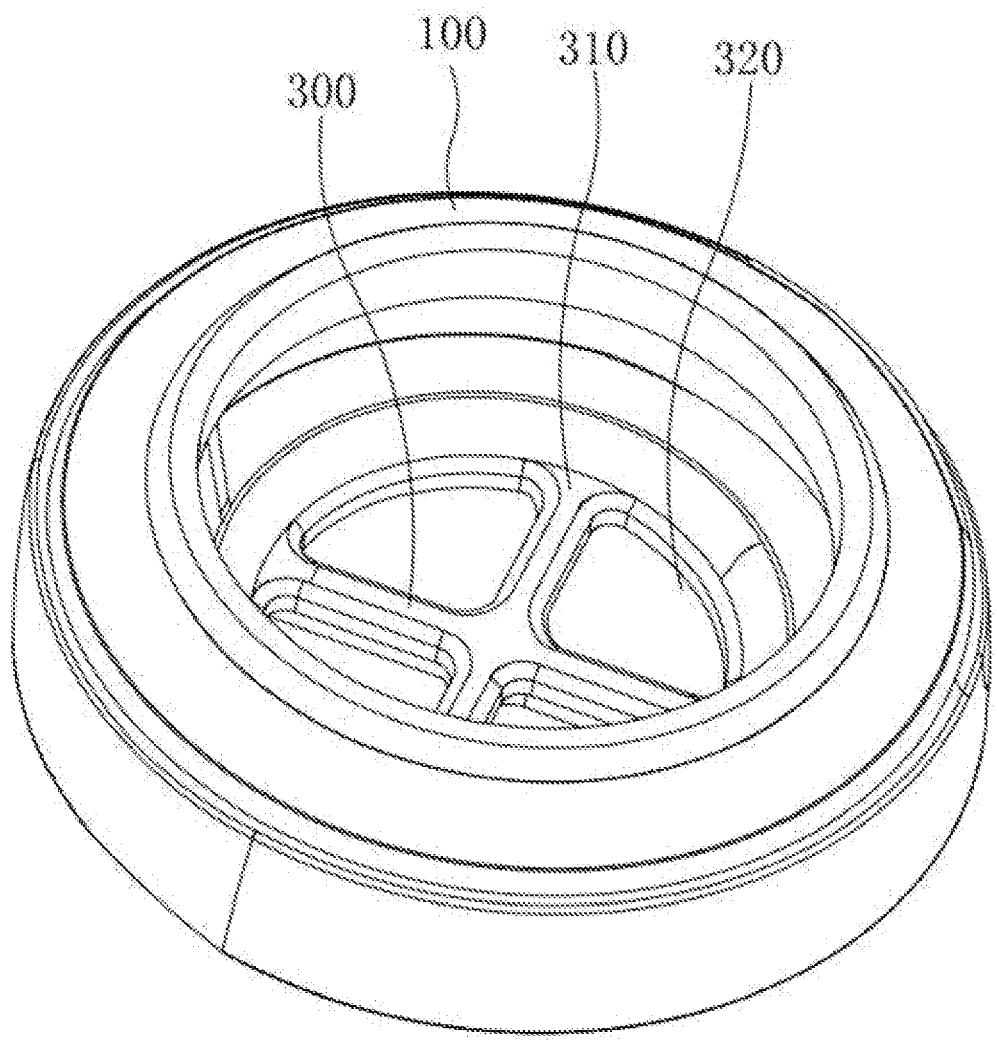
FIG. 4 is a schematic structural diagram from a top view of the leakproof cap of a soft water bottle according to the present disclosure.
Figure 5:
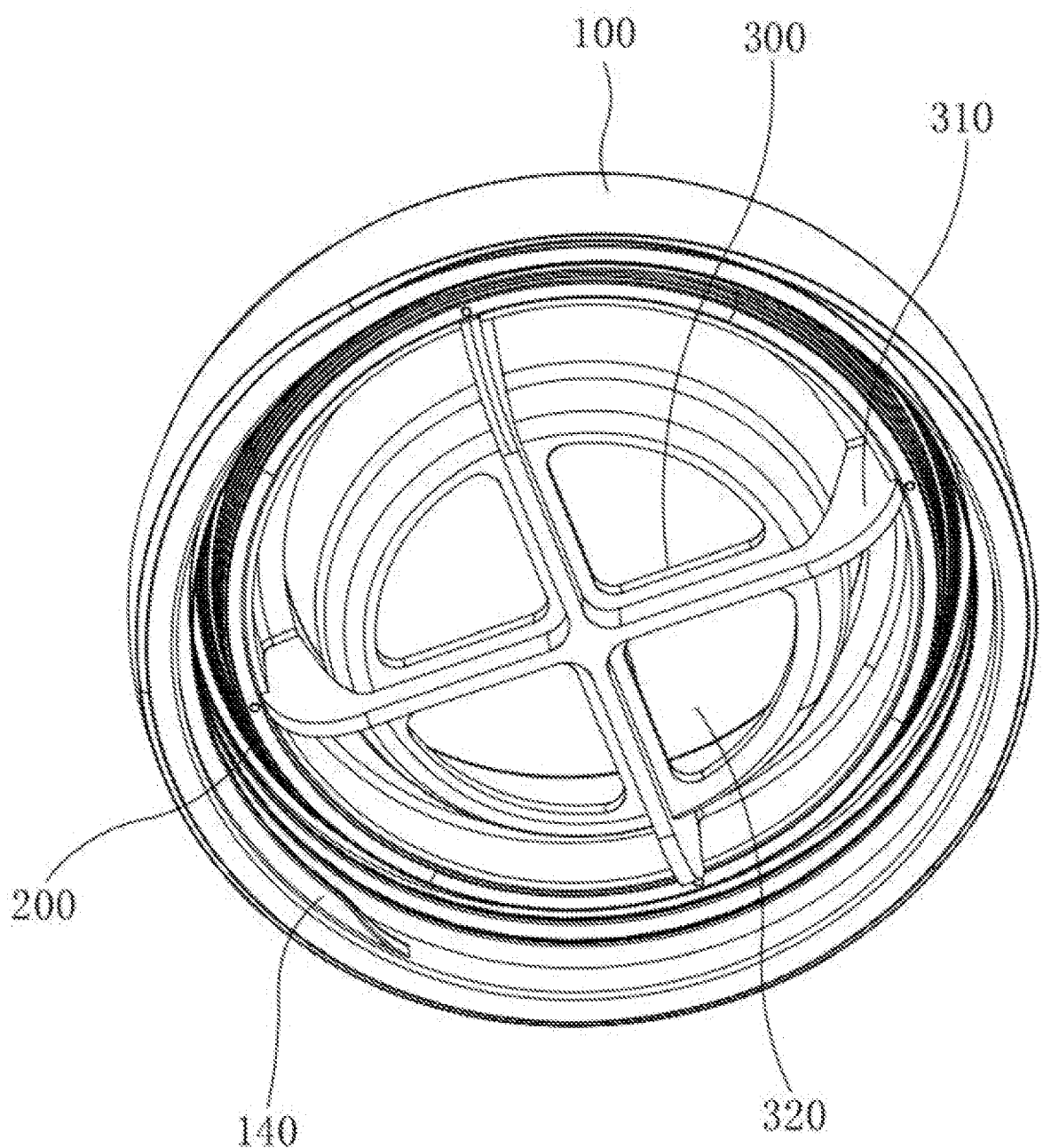
FIG. 5 is a schematic structural diagram from a bottom view of the leakproof cap of a soft water bottle according to the present disclosure.

In another implementation of the present disclosure, as shown in FIG. 4 and FIG. 5, since the soft water bottle should also have an upper cover structure for spraying liquid during actual installation, the cap body 100 is screwed with other structures of the upper cap in the leakproof cap of a soft water bottle of the present disclosure. Since the upper cap is not the focus of protection in the present application, it will not be introduced in detail here. Those skilled in the art should understand that the cap body 100 may be provided with functional structures that cooperate with other structures in the present disclosure.

Further, in the present embodiment, the shape of the cap body 100 is annular, and a fixing member 300 is also provided in an inner hole of the upper bottle cover plate 110 of the cap body 100. The function of the fixing member 300 is to support the preset shape of the cap body 100, and add other functional structures to provide beneficial functional effects for drinking water. In the present embodiment, a plurality of connecting tenons 310 are provided around the fixing member 300. The plurality of connecting tenons 310 are fixedly connected to the upper bottle cover plate 110 and the limiting ring plate 130, thereby providing support to the inner ring of the cap body 100. When the bottle opening 400 is deformed due to the deformation of the water bottle, the deformation of the cap body 100 is reduced under supportive effect from the fixing member 300. At the same time, since the cap body 100 has a limiting effect on the bottle opening 400, the deformation of the bottle opening 400 is reduced, preventing the sealing member 200 from losing efficacy due to oversized deformation of the bottle opening 400.

Furthermore, the fixing member 300 also includes a plurality of water holes 320. The plurality of water holes 320 are hollowed out between adjacent connecting tenons 310. When the user drinks from the soft water bottle, liquid flows out from the plurality of water holes 320, and then passes through the upper cover structure of the cap body 100 to form a functional drinking effect. During this process, the cap body 100 restrains the bottle opening 400, effectively preventing the water leakage at the connection position between the bottle opening 400 and the cap body 100.

Based on the present embodiments, the actual use process of the leakproof cap of soft water bottle of the present disclosure is as follows.

As shown in FIG. 3, the user puts the cap body 100 on the bottle opening 400 and screws the cap body 100 in a preset direction. During this process, the third sealing portion 230 guides the bottle opening 400 to correspond to the installation cavity 101, and in the process of strengthening the combination, a plurality of second sealing rings 242 provided on the second sealing part 220 press the inner wall of the bottle opening 400. When the combination reaches a predetermined position, a plurality of first sealing rings 241 provided on the first sealing part 210 press the upper end surface of the bottle opening 400, leading to various degrees of deformation of the first sealing rings 241 and the second sealing rings 242, and forming a water-proof structure in the space between the adjacent first sealing ring 241 and the second sealing ring 242 to seal the position of the bottle opening 400. When the bottle opening 400 deforms along with the water bottle, the first sealing rings 241 and the second sealing rings 242 are adaptively deformed following the deformation of the bottle opening 400, which ensures the sealing effect and avoids water leakage from occurring at the joint position between the bottle opening 400 and the cap body 100.

Based on the present embodiments, the present disclosure also provides a water bottle, which includes the leakproof cap as described in any one of the present embodiments. The leakproof cap includes a cap body which includes an installation cavity, a screw thread that is circumferentially arranged on a side of the installation cavity, and a sealing member which is annularly arranged on an other side of the installation cavity and is opposite to the screw thread at a predetermined distance. The sealing member is an elastic sealing member, and a side of the sealing member facing the screw thread has a plurality of sealing rings that are arranged concentrically and evenly, and a sealing cavity is formed between adjacent sealing rings. The present disclosure provides an elastic sealing member in the installation cavity of the cap body, and the sealing member corresponds to the screw thread. When the cap body is screwed on the opening of the water bottle, the screw thread and the sealing member are arranged against the upper part and outer side of the bottle opening of the water bottle, respectively. Then, there are a plurality of sealing rings concentrically arranged on the sealing member, which can form multiple barriers to the inner side of the bottle opening. When the bottle opening deforms following the bottle body, the sealing member adapts to the deformation and blocks the liquid through the plurality of sealing rings, effectively preventing liquid leakage at the bottle opening.

To sum up, the present disclosure provides a water bottle and a leakproof cap of a soft water bottle. The leakproof cap includes a cap body that includes an installation cavity, and a screw thread that is circumferentially arranged on a side of the installation cavity, and a sealing member that is annularly arranged on an other side of the installation cavity and is opposite to the screw thread at a predetermined distance. The sealing member is an elastic sealing member and a side of the sealing member facing the screw thread has a plurality of sealing rings arranged. The plurality of sealing rings are arranged concentrically and evenly, and a sealing cavity is formed between adjacent sealing rings. The present disclosure provides an elastic sealing member in the installation cavity of the cap body, and the sealing member corresponds to the screw thread. When the cap body is screwed on the opening of the water bottle, the screw thread and the sealing member are arranged against the upper part and outer side of the bottle opening of the water bottle, respectively. Then, there are a plurality of sealing rings concentrically arranged on the sealing member, which can form multiple barriers to the inner side of the bottle opening. When the bottle opening deforms following the bottle body, the sealing member adapts to the deformation and blocks the liquid through the plurality of sealing rings, effectively preventing liquid leakage at the bottle opening.

It should be understood that the application of the present disclosure is not limited to the present embodiments. For those skilled in the art, improvements or modifications can be made based on the above descriptions. All these improvements and modifications should belong to the protection scope of the appended claims of the present disclosure.

What is claimed is:

1. A cap of a bottle, comprising:
   a cap body having:
      an installation cavity;
      a screw thread circumferentially arranged on a first side of the installation cavity;
      an upper bottle cover plate;
      an outer cover plate that is arranged vertically on an outer side of the upper bottle cover plate,
         wherein the screw thread is arranged on the outer cover plate; and
      a limiting ring plate that is vertically arranged on an inner side of the upper bottle cover plate,
      wherein the upper bottle cover plate, the outer cover plate, and the limiting ring plate are integrally formed, and the installation cavity is located between the outer cover plate and the limiting ring plate; and
   a sealing member that is annularly arranged on a second side of the installation cavity that is opposite to the screw thread on the first side at a predetermined distance, wherein the sealing member is an elastic sealing member, wherein a side of the sealing member facing the screw thread has a plurality of sealing rings that are arranged concentrically and evenly, and wherein a sealing cavity is formed between adjacent sealing rings, and wherein the sealing member is arranged to fit on the upper bottle cover plate and the limiting ring plate, the sealing member further comprising:
      a first sealing part arranged to fit on the upper bottle mouth cover plate; and
      a second sealing part that is arranged to fit on the limiting ring plate,
   wherein the first sealing part and the second sealing part are in contact with each other and are integrally formed, and
   wherein the first sealing part and the second sealing part are arranged with a predetermined angle,
   wherein a cross-section of the sealing rings is semicircular, and a position between adjacent sealing rings is arranged in smooth transition, and
   wherein the sealing rings further comprise:
      one or more first sealing rings that are evenly arranged on the first sealing part and protrude toward a direction of the first sealing part away from the upper bottle cover plate; and
      one or more second sealing rings that are evenly arranged on the second sealing part and protrude toward a direction of the second sealing part away from the limiting ring plate,
      wherein a diameter of the first sealing ring is smaller than or equal to a diameter of the second sealing ring.

2. The cap of a bottle according to claim 1, wherein the sealing member further comprises a third sealing part that is arranged to fit on a bottom of the limiting ring plate, and wherein the first sealing part, the second sealing part and the third sealing part are integrally formed, and positions between the first sealing part, the second sealing part and the third sealing part where the first sealing part, the second sealing part and the third sealing part are connected to each other are arranged in smooth transition.

3. The cap of a bottle according to claim 1, wherein an installation groove is arranged on the upper bottle cover plate corresponding to the installation cavity, and the first sealing part is fitted in the installation groove, and wherein a depth of the installation groove is smaller than or equal to a thickness of the first sealing part.

4. The cap of a bottle according to claim 1, wherein a shape of the upper bottle cover plate is annular, and a fixing member is provided in an inner hole of the upper bottle cover plate, and a plurality of connecting tenons are arranged around the fixing member, and the plurality of connecting tenons are fixedly connected to the upper bottle cover plate and the limiting ring plate.

5. The cap of a bottle according to claim 4, wherein the fixing member comprises a plurality of water holes that are hollowed out at positions between adjacent connecting tenons.

6. The cap of a bottle according to claim 1, wherein the sealing member is two-stage injection molded and arranged on the cap body, and the sealing member and the cap body are made of different materials.

7. A water bottle comprising the cap according to claim 1.

8. A cap of a bottle, comprising:
   a cap body having:
      an installation cavity;
      a screw thread circumferentially arranged on a first side of the installation cavity;
      an upper bottle cover plate;
      an outer cover plate that is arranged vertically on an outer side of the upper bottle cover plate,
         wherein the screw thread is arranged on the outer cover plate; and
      a limiting ring plate that is vertically arranged on an inner side of the upper bottle cover plate,
      wherein the upper bottle cover plate, the outer cover plate and the limiting ring plate are integrally formed, and the installation cavity is located between the outer cover plate and the limiting ring plate, wherein a shape of the upper bottle cover plate is annular, and a fixing member is provided in an inner hole of the upper bottle cover plate, and a plurality of connecting tenons are arranged around the fixing member, and the plurality of connecting tenons are fixedly connected to the upper bottle cover plate and the limiting ring plate; and a sealing member that is annularly arranged on a second side of the installation cavity that is opposite to the screw thread on the first side at a predetermined distance, wherein the sealing member is an elastic sealing member and is arranged to fit on the upper bottle cover plate and the limiting ring plate, wherein a side of the sealing member facing the screw thread has a plurality of sealing rings that are arranged concentrically and evenly, wherein a sealing cavity is formed between adjacent sealing rings.

9. The cap of a bottle according to claim 8, wherein the fixing member comprises a plurality of water holes that are hollowed out at positions between adjacent connecting tenons.

\* \* \* \* \*